Nov. 8, 1960          J. R. YOUNKIN          2,959,725

ELECTRIC TRANSLATING SYSTEMS

Filed June 13, 1957

INVENTOR
James R. Younkin

BY    *Donald H. Fidler*

ATTORNEY

United States Patent Office 2,959,725
Patented Nov. 8, 1960

2,959,725

ELECTRIC TRANSLATING SYSTEMS

James R. Younkin, 717 Blossom Drive, Garland, Tex.

Filed June 13, 1957, Ser. No. 665,390

3 Claims. (Cl. 321—18)

This invention relates to electric translating systems and more particularly to such systems for transmitting energy between a direct current supply circuit and an alternating current load circuit.

In the operation of electric translating systems for transmitting energy from a direct current supply circuit to an alternating current load circuit, difficulty is encountered in maintaining the voltage of the alternating current load circuit constant where substantial variations occur in the voltage of the direct current supply circuit and in the load conditions of the alternating current load circuit.

It is an object of this invention to provide a new and improved electric translating system.

It is an object of this invention to provide a new and improved regulating system.

It is an object of this invention to provide a new and improved electric regulating system for an electric translating system.

It is an object of this invention to provide a new and improved electric translating system which uses unidirectional conducting means.

It is an object of this invention to provide a new and improved control means which senses changes in load and regulates the output of the electric translating means.

It is an object of this invention to provide a new and improved control means which senses changes in load and produces a control signal which regulates the output of the electric translating means.

It is an object of this invention to provide a new and improved control means which senses changes in load and produces a control signal which regulates the output of the electric translating means by varying the amount of conductivity of the electric translating means.

It is an object of this invention to provide a new and improved frequency generator.

It is an object of this invention to provide a new and improved oscillator.

It is an object of this invention to provide a new and improved frequency generator composed of an oscillator and multivibrator.

These and other objects will be apparent in the following disclosure of the invention.

Briefly stated, this invention is concerned with providing a new and improved electric translating system for transmitting energy from a direct current supply circuit to a constant voltage alternating current load. A control circuit to maintain a constant voltage is provided which senses the output voltage to the load circuit and, in turn, compares the output voltage to a reference voltage to produce a control potential which, in turn, is used to regulate the conductivity of the electric valves in the inverters and hence, the output voltage.

The electric translating system comprises a main inverter having a transformer, a primary winding and a pair of unidirectional conducting means such as electric valves. The electric valves are caused to conduct alternately which results in an alternating current in the primary windings of the transformer which is transferred to the secondary windings and the alternating current load. Also in the system are amplifying inverters to supply the main inverter with an amplified alternating current control signal to cause the electric valves of the main inverter alternately to conduct. The alternating current control signal is produced by an electric chopper which transmits energy from a direct current control potential into the alternating current control signal at a frequency which is determined by an auxiliary source of standard frequency, the standard frequency being the same as the desired frequency for the alternating current load. The magnitude of the alternating current control signal controls the rate or amount of conductivity of the inverter valves. The control means for producing the direct current control potential which is supplied to the electronic chopper is obtained by connecting a voltage sensing circuit or voltage controlling circuit across the primary winding of the main inverter transformer. The voltage sensing circuit compares the voltage of the main inverter to a reference voltage network or reference bridge to produce the direct current control potential which is changed to an alternating current control signal by the electronic chopper which, in turn, controls the amount of conductivity of the amplifying inverters and the main inverter. If the voltage across the main inverter transformer tends to increase, the direct current control potential produced by the reference bridge decreases and, hence, the alternating current control signal for the amplifying inverters and main inverter decreases the amount of conductivity of the inverter valves which tends to limit the increase of the voltage across the main inverter transformer. Conversely, if the voltage across the main inverter transformer tends to decrease, the direct current control potential produced by the reference bridge increases, and, hence, the alternating current control signal for the amplifying inverters and main inverters increases which increases the amount of conductivity of the inverter valves which, in turn tends to limit decrease of the voltage across the main inverter transformer. It will be readily apparent that a continuous regulation of the output voltage is obtained. Similarly, variations in the direct current input which produce variations in the main inverter transformer voltage are regulated to provide a regulated voltage output.

For a better understanding of the invention reference may be had to the accompanying drawing wherein.

Figure 1:
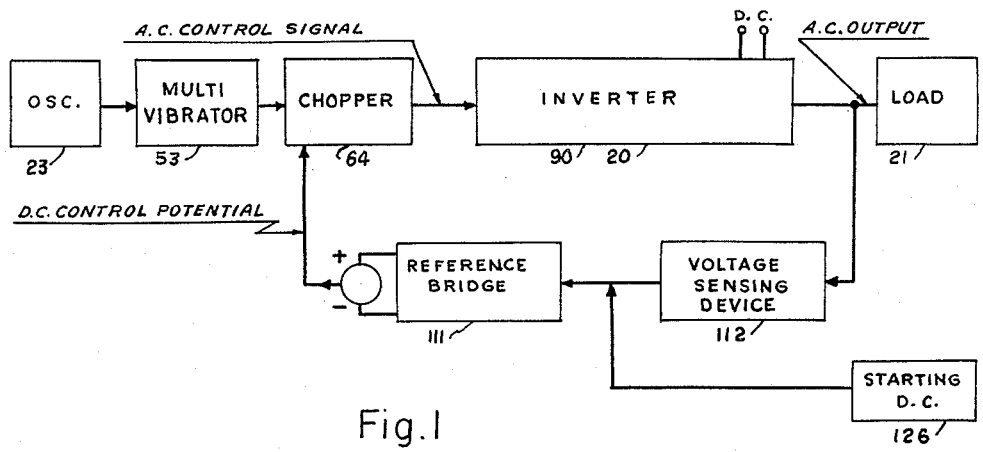
Fig. 1 is a block diagram of the basic embodiment of my system.

Referring now to Figure 1, there is shown in the block diagram the basic embodiment of the system wherein the energy from a direct current is supplied to the amplifier inverters and the main inverters and is transmitted to the alternating current output load 21. The alternating current output has a frequency which is determined by the frequency of the electronic chopper 64 and the magnitude of the output voltage is controlled by the amount or magnitude of direct current control potential which is supplied to the electronic chopper. The frequency at which the electronic chopper is driven is determined by the frequency of oscillation of an alternating current supplied from the multivibrator 53 which is, in turn, a frequency divider for the source of alternating current of standard frequency, the oscillator 23. The oscillator 23 has a very high frequency of oscillation in order to minimize effects of external vibration to the system. To produce the direct current control potential for the electronic chopper 64, a sensing system 110 provides a feedback to a voltage sensing device 112 which rectifies the alternating current and compares the rectified voltage in a divider and reference network 111 against a reference voltage which in turn, produces the direct current control potential. The direct current control potential is fed to the electronic chopper 64 which transmits the energy from the direct current control potential to an alternating current control signal which is amplified and supplied to the control member of the electric valves of the amplifier inverters. If the voltage in the alternating current output decreases, the subsequently produced direct current control potential will be increased which in turn, increases the alternating current control signal to the amplifying inverters and, hence, tends to increase the output voltage to the normal output voltage. Conversely, if the voltage in the output increases, the direct current control potential signal decreases which, in turn, decreases the alternating current control signal to the amplifying inverter and, hence, tends to decrease the output voltage to the normal output voltage.

Figure 2:
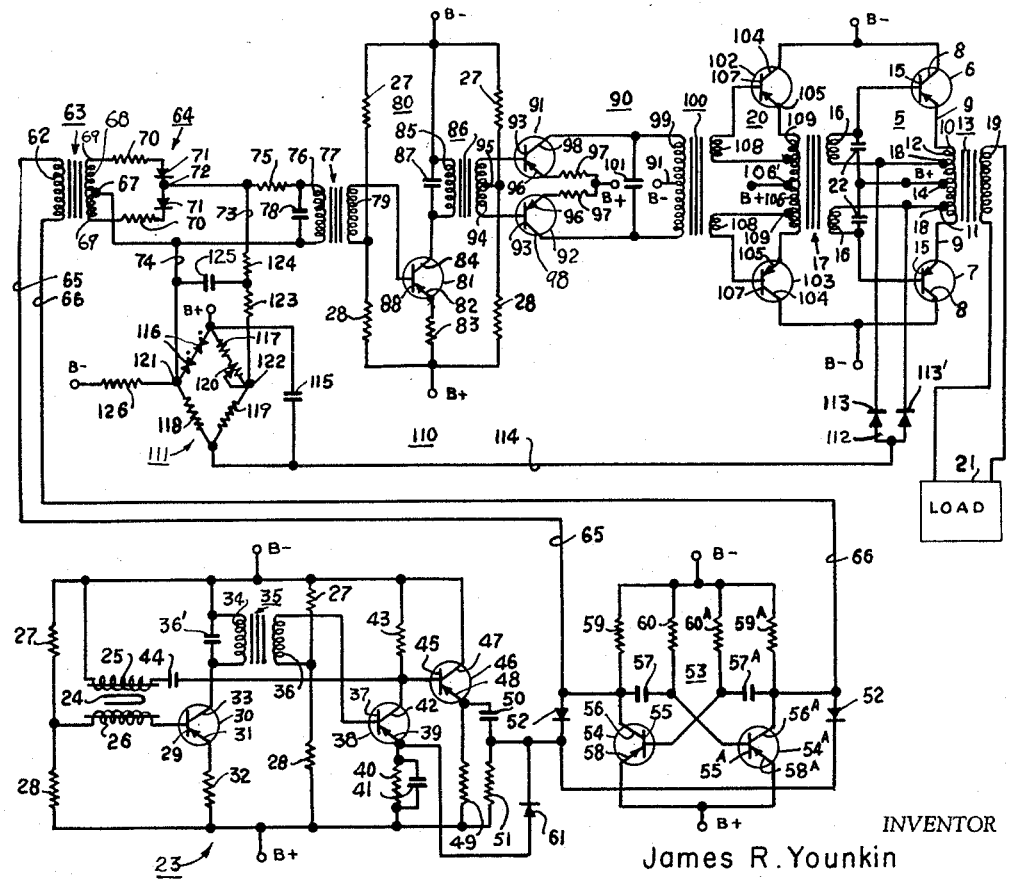
Fig. 2 is the circuit arrangement of the electric translating system.

Referring now more particularly to Figure 2, the schematic arrangement of the electric translating system is illustrated with the main components, namely, the electronic chopper 64 to transmit the energy from the direct current control potential to the alternating current control signal, the amplifying inverters 90, 20 to amplify and filter the alternating current control signal, the main inverter 5, the sensing device 112 to provide a voltage to compare with the reference bridge 111 which produces the direct current control potential to be supplied to the electronic chopper 64, the multivibrator 53 and oscillator circuits 23.

The main inverter 5 has two electric valves 6, 7, such as transistors or the like, push-pull connected for alternate conduction. Each transistor is of the p-n-p type, although it will be apparent that other types may be used, and have their collectors 8 connected to the negative side of a direct current source and the emitters 9 connected through the respective ends 10, 11, of the primary winding 12 of the main inverter transformer 13 to the positive side of a direct current source at the electrical midpoint 14 of the primary winding. The respective bases 15 of the transistors are connected through secondary windings 16 of the second stage amplifying inverter transformer 17 to electrical taps 18 on the primary windings on the main inverter transformer. This provides a negative feedback for the base-emitter circuit. When the potential across the secondary windings 16 of the second stage amplifying inverter transformer causes the base of one transistor to go more negative, an increased emitter-base current flow occurs causing an increased emitter-collector current flow. This, of course, causes an increased current flow in the primary winding 12 of the main inverter transformer 13. The potential across the secondary winding 16 of the second stage amplifying inverter is opposite to the potential across the primary winding 12 between the electrical tap 18 on the main inverter and the emitter 9 and the net effect is to subtract the potential across electrical tap and emitter from the biasing potential across the secondary winding 16 of the second stage amplifying inverter 20. This is, essentially, a degenerative feedback which reduces the biasing effect of the secondary winding 16 of the amplifying inverter and, in turn, provides a stabilized current flow in the conducting transistor. While one transistor is conducting, the other transistor is nonconducting since the secondary winding 16 of the amplifying inverter has opposite polarity across it. When the polarity of the secondary winding 16 reverses, the transistor conducting will become nonconducting and the nonconducting transistor will conduct and the current flow thru the primary winding will be reversed. It will therefore be appreciated that the alternate conduction of the transistors causes an alternating current and potential to be produced in the primary winding 12 of the main inverter transformer 13 which, in turn, induces an alternating current in the secondary windings 19 to the load 21. A pair of capacitors 22 is connected between the bases 15 and the positive side of the direct current source to provide a low impedance path for high frequencies; thus high frequency oscillation is prevented.

It will be appreciated that the amount of conductivity of the transistors 6, 7, is dependent upon the power received from the secondary winding 16 of the second stage amplifying inverter transformer 17. If the power across the secondary windings 16 increases, the conductivity of the alternately conductive transistors 6, 7, will increase and, hence, the output alternating voltage across the primary windings 12 of the main inverter transformer 13 will increase. Conversely, if the power across the secondary windings 16 decreases, the conductivity of the alternately conducting transistors 6, 7, will decrease and, hence, the alternating voltage on the primary windings 12 of the main inverter transformer 13 will decrease. It will also be apparent that the frequency of the alternating control signal, or, the time of conductivity of the alternately conducting transistors 6, 7, is determined by the frequency of the alternating control signal in the secondary windings 16. The magnitude of the alternating signal in the secondary windings 16 is controlled by the control means to be explained, and the frequency of the alternating potential is determined by an auxiliary frequency source 23.

It will be understood that any source of standard frequency may be suitable, however, a very stable source of frequency has been provided as follows. The auxiliary source of frequency, namely, the oscillator 23, has a standard frequency source such as a tuning fork 24 having a driving coil 25 and a pick up coil 26. The pick up coil 26 is connected between a biasing network of resistances 27, 28 which are connected across a direct current source, and the base 29 of a transistor 30. The transistor 30 also has an emitter 31 connected to the positive side of the direct current source through a bias stabilization resistor 32 and a collector 33 which is connected to the negative side of the direct current source through a primary winding 34 of a coupling transformer 35 and a shunt connected capacitor 36'. A varying potential and current in the pick up coil 26 will cause a varying base current flow in the transistor 30 which in turn causes a varying current and potential in the primary winding 34 of the coupling transformer 35 which is transferred to the secondary winding 36 by inductive coupling in a manner well known. The secondary winding of the coupling transformer 36 is connected between a biasing network of resistances 27 and 28 as described above, and the base 37 of a transistor 38. An emitter 39 is connected to the positive side of a direct current source through a bias stabilizing resistance 40 and a shunting by-pass condenser 41, and the collector 42 is connected to the negative side of a direct current source through a load resistor 43. The transistor 38 operates in a manner similar to the previous transistor 30 to amplify the current passing thru it according to the signal applied to the base 37. The collector 42 is also connected to the negative side of the direct current source through a series connected coupling capacitor 44 and the driving coil 25 of the tuning fork 24. It will be readily apparent to those skilled in the art that the above provides feedback loop which provides a driving signal for the driving coil 25 which, in turn, is transferred by means of the tuning fork 24 to the pick up coil 26. The oscillator 23 starts when the power is applied to the circuit and the fork 24 oscillates at its resonant frequency which is the stable operating frequency. This frequency may, for example, be 2400 cycles per second. The collector 42 of transistor 38 is also connected to the base 45 of another transistor 46 which has a collector 47 connected to the negative side of the direct current source and an emitter 48 which is connected to the positive side of the direct current source through a load resistor 49. The transistor 46 operates as a grounded collector amplifier to amplify the output of the oscillator 23. A circuit consisting of a series connected capacitance 50 and resistance 51 is connected between the emitter 48 and the positive side of the direct current source. A differentiated output signal is taken off between the resistance 51 and the capacitor 50 which has a waveform alternating between relative positive and negative peak pulses at the frequency of the oscillator 23. A pulse limiting diode 61 is provided to clip the peaks of the pulses and will be fully explained later. The peak pulses are formed by providing a short time constant for the R–C network. The output is fed to limiting diodes 52 and the multivibrator 53 which divides the frequency of the oscillator 23. The frequency of the oscillator 23 is such that external shocks to the system will not affect the frequency of the fork 24.

Turning now to the multivibrator 53 which is a free running, synchronized type, there are employed two transistors 54, 54A, each having a base 55, 55A connected to the collector 56, 56A of the other transistor through a coupling capacitor 57, 57A and each having an emitter 58, 58A connected to the positive side of a direct current source. The collectors 56, 56A are also connected to the negative side of the direct current source through load resistors 59, 59A. A bias resistor 60, 60A is also connected between each base 55, 55A and the negative side of the direct current source. It will be readily apparent to those skilled in the art that while one transistor is conducting, the other is cut off. The timing of conductivity is determined by the values of the resistances 60, 60A and capacitors 57, 57A. If the frequency of the fork is 2400 cycles, the multivibrator may, for example, be 400 cycles per second. When the direct current power supply is connected across the circuit, the multivibrator is put into operation. Assume, for explanation, that the collector current in transistor 54 increases. This produces an increase in the voltage across resistance 59 with the collector end of the resistance becoming more positive. Capacitor 57 which is connected to resistance 59 attempts to become more positive and the base 55A of the transistor 54A likewise becomes more positive which, in turn, decreases the current through the transistor 54A and resistance 59A. The lowered voltage across resistance 59A means that the collector end of this resistance becomes less positive or relatively negative to its previous value. Capacitor 57A transmits this negative increase to the base 55 of the first transistor 54 and consequently more collector current flows through resistance 59. The process continues in this manner with the base 55 of the first transistor 54 becoming more negative and driving the base 55A of the other transistor 54A more positive by the large positive charge built up across capacitor 57. The base current of the transistor 54A is rapidly brought to zero by this sequence of events. The transistor 54A remains inactive until the positive charge of capacitor 57 discharges and removes the large positive potential on the base 55A of the transistor 54A. The path of discharge of capacitor 57 is through the resistance 60. When capacitor 57 has discharged sufficiently, the base current thru base 55A starts to flow and, hence, collector current starts to flow through resistance 59A causing the collector end of the resistance 59 to become less negative. This now places a positive voltage on the base 55 of the first transistor 54 and the collector current through transistor 54 decreases to zero. The reduction in the voltage drop across resistance 59 causes the collector end of the resistor 59 to increase negatively and the base 55A of the transistor 54A receives this negative going voltage thru the capacitor 47. The increased current through resistance 59A quickly raises the voltage on collector 56A and raises the voltage on base 55 which cuts off the transistor 54. When the excess charge on capacitor 57A leaks off, thru resistance 60A, the process starts over again.

The entire operation may be summed up by stating that, first, the collector current of one transistor rises rapidly, driving the second transistor to cut off. This condition remains until the second transistor is released from its cutoff state and starts to conduct. It is now the first transistor which is cut off. When the first transistor is again permitted to conduct, the second transistor is driven into nonconduction. The switching continues in this manner, with the frequency determined by the time constant of the resistors and capacitors. In order to divide the frequency of the oscillator, the frequency of the switching of the multivibrator is made a submultiple of the oscillator frequency. The coupling diodes 52 pass the negative pulses from the differentiator network 50, 51 which, in turn, controls the switching action of the multivibrator transistors 54, 54A to provide a synchronized switching action of the multivibrator 53, and hence, precise frequency of operation. To insure positive synchronization, and constant amplitude of pulses under all conditions of temperature and other variables, a limiting diode 61 is connected between the emitter 39 of the transistor 38 and the coupling diodes 52 of the multivibrator 53 so that the synchronizing pulses will be limited since a large transient pulse could cause premature switching. The primary winding 62 of the switching transformer 63 of the electronic chopper 64 is connected to the multivibrator output collectors 56, 56A so that the switching transformer 63 receives the alternate switching signal which is at a predetermined frequency as determined by the frequency source.

The electronic chopper 64 which converts the direct current control potential from voltage divider and reference network 111 to an alternating current control signal will now be explained. The electronic chopper 64 produces the same result as a mechanical chopper and eliminates sensitivity to mechanical vibrations. More specifically, the chopper is comprised of a switching transformer 63 wherein one of the direct current control potential conductors 74 is connected to the electrical midpoint 67 of the secondary winding 68 of the switching transformer 63 and the ends 69 of the winding 68 are connected to resistances 70 and a pair of serially connected diodes 71 to form a closed loop. The midpoint 72 between the diodes 71 is connected to the other direct current control potential conductor 73. The primary winding 62 of switching transformer 63 is connected to the multivibrator 53 so that an alternating potential and current of the predetermined frequency is produced in the primary winding. Also shunt connected across the direct current control potential conductors 73, 74 through a series resistance 75 is the primary winding 76 of a coupling transformer 77. A capacitance 78 is connected between the ends of the winding 76 to provide a parallel resonant circuit. The secondary winding 79 of the coupling transformer 77 is connected to an amplifying means 80. The alternate conducting and nonconducting of the closed loop of the electronic chopper 64 causes the coupling transformer 77 to receive a varying potential which is the alternating current control signal. Assume, for the purposes of explanation, that the direct current control potential across conductors 73, 74 is merely a battery of a certain potential. Also, it is necessary that the alternating potential of the switching transformer 63 be relatively large compared to the direct current potential. Under these conditions, when the polarity of the secondary winding of the switching transformer is such that the diodes 71 of the closed loop conduct, it will be seen that both sides of the closed loop are balanced, that is, there is an equal voltage drop across the sides and the direct current control potential is short-circuited thru the diodes 71, the resistors 70 and the windings 68 and, hence, there is very little potential across the shunted transformer winding 76. Conversely, when the polarity of the secondary winding of the switching transformer 63 is such the diodes 71 are nonconductive and thus presenting a high impedance between the electrical midpoint 67 and the midpoint 72, it will be seen that the entire direct current control potential is impressed across the transformer winding 76. Consequently, the alternating potential on the switching transformer 63 causes a varying potential which is essentially a square wave to be applied to the coupling transformer 77 at a frequency which is determined by the frequency of the alternating potential on the switching transformer 62 and at a magnitude which is determined by the magnitude of direct current control potential across conductors 73, 74.

The coupling transformer 77 is connected to an amplifying means 80 which is composed of a transistor 81 having an emitter 82 connected to the positive side of a source of direct current through a bias stabilizing resistor 83, a collector 84 connected to the negative side of a source of direct current through the primary winding 85 of a coupling transformer 86 and shunted capacitance 87, and a base 88 which is connected to a biasing network of resistances 27, 28 through the secondary winding 79 of the coupling transformer 77. As will be apparent to those skilled in the art, the above described a ground emitter amplifier using a p-n-p transistor.

In the biasing network, the resistances 27, 28 are connected between the positive and negative source of direct current. The resistance 28 biases the base-emitter circuit in a forward direction, that is, the base 88 is biased negatively with respect to the positively biased emitter 82 and the resistance 27 biases the collector-base circuit in a reverse direction, that is, the base 88 is biased positively with respect to the negatively biased collector 84. In this manner a current flow from the emitter 82 to the base 88 and a current flow from the emitter 82 to the collector 84 is obtained. As is well known to those skilled in the art, the current flow through the emitter 82 to the collector 84 is many times greater than the current flow from the emitter 82 to the base 88. Since the emitter-to-base resistance is low and the collector-to-base resistance is high because of the reverse biasing, a current gain is obtained in the collector-base circuit. It will now be appreciated that if an alternating potential and current is applied to the coupling transformer 77, it will vary the current on the base 88. For example, if the end of the secondary winding attached to the base 88 is positive with respect to the other end attached to the biasing network; the voltage from the base 88 to the emitter 82 will be decreased and consequently the current flow from the emitter 82 to the collector 84 will be decreased. Conversely, when the secondary winding attached to the base 88 is negative with respect to the other end, the voltage is increased and consequently the current flow from the emitter 82 to the collector 84 is increased. It will be appreciated that the varying current flow in the collector circuit will vary the potential across the primary winding 85 of the coupling transformer 86. The stabilizing resistor 83 in the base-emitter circuit operates to prevent the collector current from exceeding a safe operating limit since increased current flow through the resistor automatically decreases the emitter-base bias and, consequently, increased temperature which causes increased collector current, is compensated for.

Turning now to the first stage amplifier inverter 90, a pair of p-n-p transistors 91, 92 are connected in a push-pull arrangement for amplification of the varying potential and current received from the coupling transformer 86. The transistors have their respective bases 93 connected to the ends of the secondary winding 94 of the coupling transformer 86. The electrical midpoint 95 of the secondary winding is connected to a biasing network consisting of resistances 27, 28 serially connected between the positive and negative source of direct current. The resistance provides a forward bias voltage for each of the bases. The emitters 96 of each of the transistors 91, 92 are connected through bias stabilizing resistances 97 to the positive side of the source of direct current. It will be apparent, that as in the amplifier, a base-emitter current is provided for each transistor and since the current flows in opposite directions from the ends of the winding to the electrical midpoint of the secondary winding so that any flux in the winding 94 caused by the direct current flow is cancelled out. The collectors 98 of each of the transistors 91, 92 are connected to the ends of the primary winding 99 of the first stage coupling transformer 100, and the electrical midpoint 91 of the primary winding 99 is connected to the negative side of the source of direct current. The resistance 27, 28 in the biasing network provides a biasing voltage between the collector 98 and the base 93. It will be appreciated that the direct current flow through the first stage primary winding 99 is in opposite directions and cancels out the direct current flux component. When the alternating current signal across the ends of the secondary winding 94 of the coupling transformer 86 has one polarity it makes the base of one transistor positive with respect to the base of the other transistor. The voltage from emitter to base of one transistor is increased causing increased current flow in the collector-emitter circuit of that transistor while the voltage from the emitter to the base of the other transistor is decreased which decreases the current flow in the collector-emitter of that transistor. Conversely, when the signal alternating current on the coupling transformer 86 reverses polarity, the second transistor conducts more while the first transistor conducts less. The alternating conduction of the transistors 91, 92 consequently produces an alternating current flow and voltage in the primary winding 99 of the first stage coupling transformer 100. A capacitor 101 is shunt connected across the primary winding 91 to form a parallel resonant circuit and thus shape the alternating current wave form, in a manner well known.

The second stage amplifier inverter 20 consists of a pair of p-n-p transistors 102, 103 connected between the first stage transformer 100 and the second stage transformer 17. The collectors 104 of the transistors 102, 103 are connected to the negative side of the source of direct current and the emitters 105 are connected to the positive side of the direct current source through the ends of the primary winding 106 of the second stage coupling transformer 17 and the electrical midpoint 106' of the primary winding. The bases 107 of the transistors 102, 103 are connected to one end of separate secondary windings 108 of the first stage coupling transformer 100 while the other ends of the windings 108 are connected to an electrical tap 109 on the primary winding 106 of the second stage transformer 17 and hence, to the positive side of the direct current source at the electrical midpoint 106'. The secondary winding 16 of the second stage transformer 17 is connected to the main inverter as previously discussed. The operation of the second stage amplifying inverter is the same as discussed supra with respect to the main inverter operation.

Turning now to the sensing system 110 to produce the direct current control potential applied to the electronic chopper 64, the voltage on the primary winding of the main inverter transformer 13 is continuously sensed and applied to a reference bridge 111 which produces the direct current control signal which, in turn, is applied to the electronic chopper 64 and the alternating current control signal produced is amplified by the amplifying inverters 90 and 20 to provide the alternating current control signal for the main inverter 5.

In accomplishing this control, a sensing means such as a full wave rectifier 112 is connected across the primary windings 12 of the main inverter transformer 13. The rectifier consists of a pair of diodes 113 having cathodes connected to the electrical taps 18 of the primary winding 12 of the main inverter transformer 13 to the negative side of a direct current source through end portions of the primary winding 12 and the transistors 6 and 7 and anodes connected together to a return conductor 114. Between the positive side of the direct current source and the anode return conductor 114 are a shunt connected capacitance 115 and reference bridge circuit 111. It will be readily apparent that when a potential is induced in the primary winding 12 of the inverter transformer 13, a current flow will occur from the positive side of the direct current source through the bridge 111 and one diode 113 and when the potential on the primary winding reverses, the other diode 113' will conduct so that a pulsating direct current is produced in the reference bridge circuit 111. The shunted capacitance 115 acts as a filter to smooth out the pulsating direct current. A pair of serially connected zener diodes 116 or any other constant voltage device, comprises one arm of the reference bridge circuit while the other three arms are comprised of resistances 117, 118 and 119. A variable resistance 120 is connected in one arm to provide an adjustment for various desired voltage levels in the bridge arms 117, 119. As is well known, the zener diodes 116 are constant voltage devices when excited by currents of proper order of amplitude and direction. Variations in current flow are compensated by varying resistivity of the diodes so that for varying current flow a constant potential is maintained across the diodes. Assuming the diodes are conducting when the direct current is applied to the bridge 111, it will be seen that current flows through the diodes 116 and resistance 118 to the return conductor 114 and also through resistances 117, 120, 119 to the return conductor 114. The current flow through resistance 117 will produce a given potential across the resistance and it will be seen that if a measurement is taken at terminals 121, 122 of the bridge 111 that the measurement will indicate the difference in potential between the potential across the zener diodes 116 and the potential across the resistance 117. The difference in potential between terminals 121, 122 is referred to as the direct current control potential and it is this potential which controls magnitude of the alternating current control signal for the amplifying inverters and main inverter. Terminals 121, 122 are connected by means of conductors 73, 74 to the electronic chopper 64. Conductor 73 has a serially connected filter resistance 123 and load resistance 124 and a filter capacitor 125 is connected between the conductors. It may then be appreciated that, if the output voltage on the main inverter 5 is, as desired, the direct current control potential will have a certain magnitude. If the main inverter alternating potential increases, the reference bridge 111 will receive more direct current flow through the legs 116, 118 and legs 117, 119 of the bridge. The increased current flow through the diodes 116 will not change the potential across the diodes. However, the increased current flow causes the potential across resistance 117 to increase and at points 121, 122 it will be seen that the difference in potential is thereby decreased and, accordingly, the decreased direct current control potential decreases the magnitude of the alternating current control signal to the amplifying inverter and, in turn, the main inverter will conduct less which tends to decrease the output voltage to the regulated voltage level. If the output alternating potential decreases, less current flows through the reference bridge 111 and the potential across resistance 117 decreases which causes the difference in potential across points 121, 122 to increase. The increased direct current control potential, in turn, increases the alternating current control signal to the amplifying inverter and the main inverter which causes the main inverter to conduct more and, hence, tends to increase the alternating potential across the main inverter transformer to the regulated voltage level.

Although the above apparatus will operate upon the application of the direct current power source, an added refinement is the provision of a starting direct current source which insures operation under the most adverse conditions. This is provided by connecting a resistance 126 in the bridge network 111 between the leg of the bridge containing the zener diodes 116 and the resistance leg 118. It will be apparent that this connection insures a potential difference to exist between the terminals 121 and 122 and consequently a direct current control potential will be provided for the initial starting of the system.

It should readily be apparent from the foregoing that this invention has provided an electric translating system to transmit energy from a direct current supply source to an alternating current load circuit at a predetermined frequency with control means to sense the voltage of the alternating current load circuit and provide a control signal to the electric translating apparatus whereby the output alternating current may be regulated. Also a frequency generator has been provided which produces a stable operating frequency with a high degree of a stability.

While the disclosure has shown and described the invention as applied to a particular system of connections and embodying various devices, it will be obvious to those skilled in the art that changes and modifications may be made without departing from the invention and, therefore, the appended claims include and cover all such changes and modifications as fall within the true spirit and scope of this invention.

I claim:
1. An electric translating apparatus for transmitting energy between a direct current supply circuit and an alternating load circuit comprising: an inductive winding, a plurality of electric valves connected to said inductive winding, said electric valves being provided with control elements; a secondary inductive winding coupled to said first winding for energizing said alternating current load circuit; and control means connected to said control elements of said electric valves for rendering said valves alternately conductive to produce an alternating current in said inductive windings, said control means comprising means for producing a potential which varies at a predetermined frequency, amplifying means for amplifying said potential, means operatively associated with said inductive windings and connected to said means for producing said varying potential for varying the amplitude of said potential prior to its amplification by said amplifying means in accordance with the voltage of said load circuit to maintain said voltage substantially constant.

2. The device of claim 1 wherein said means for producing a potential which varies at a predetermined frequency comprises a transformer having a primary winding and a secondary winding, said primary winding being adapted to be connected to a source of alternating current of a predetermined frequency and said secondary winding being connected in series with a first resistance, a first rectifying means, a second rectifying means, and a second resistance, said amplifying means being connected to the electrical midpoint of said secondary winding and a point between said first rectifying means and said second rectifying means, said electrical midpoint and said point constituting the output terminals of said means for producing a potential, said means for varying the amplitude of said potential producing a control potential on the output of said means for producing a potential.

3. The device of claim 2 wherein said means for varying the amplitude of said potential comprises a third rectifying means, and a voltage reference bridge whose output terminals are connected to said point and said electrical midpoint and whose input terminals are connected to one of said inductive windings through said third rectifying means.

References Cited in the file of this patent
UNITED STATES PATENTS

| | | |
|---|---|---|
| 2,070,446 | Mittag | Feb. 9, 1937 |
| 2,547,162 | Kidd | Apr. 3, 1951 |
| 2,573,137 | Greer | Oct. 30, 1951 |
| 2,574,188 | Murray | Nov. 6, 1951 |
| 2,618,772 | Bunblasky | Nov. 18, 1952 |
| 2,783,380 | Bonn | Feb. 26, 1957 |
| 2,785,370 | Levy | Mar. 12, 1957 |